United States Patent
Gruber et al.

(10) Patent No.: US 10,723,434 B2
(45) Date of Patent: Jul. 28, 2020

(54) AIRCRAFT PROPULSION UNIT COMPRISING AN UNDUCTED-FAN TURBINE ENGINE AND AN ATTACHMENT PYLON

(71) Applicant: SAFRAN AIRCRAFT ENGINES, Paris (FR)

(72) Inventors: Mathieu Simon Paul Gruber, Moissy-Cramayel (FR); Norman Bruno Andre Jodet, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 333 days.

(21) Appl. No.: 15/551,921

(22) PCT Filed: Feb. 18, 2016

(86) PCT No.: PCT/FR2016/050370
§ 371 (c)(1),
(2) Date: Aug. 18, 2017

(87) PCT Pub. No.: WO2016/132073
PCT Pub. Date: Aug. 25, 2016

(65) Prior Publication Data
US 2018/0065727 A1    Mar. 8, 2018

(30) Foreign Application Priority Data
Feb. 19, 2015  (FR) ..................................... 15 51395

(51) Int. Cl.
*B64C 1/16*   (2006.01)
*B64C 1/40*   (2006.01)
(Continued)

(52) U.S. Cl.
CPC .................. *B64C 1/16* (2013.01); *B64C 1/40* (2013.01); *B64D 27/14* (2013.01); *B64D 29/04* (2013.01);
(Continued)

(58) Field of Classification Search
CPC .......... B64C 1/16; B64D 29/04; B64D 27/14; B64D 27/20
See application file for complete search history.

(56) References Cited

U.S. PATENT DOCUMENTS 4,953,812 A * 9/1990 Van der Hoeven .... B64D 27/14
                                                        244/119
8,820,676 B2 * 9/2014 Cazals ..................... B64C 15/12
                                                         244/56
(Continued)

FOREIGN PATENT DOCUMENTS

DE     3319566 A1 * 12/1984  .............. B64C 1/16
EP    2 327 628 A2   6/2011
(Continued)

OTHER PUBLICATIONS

International Search Report dated Jun. 6, 2016 in PCT/FR2016/050370 filed Feb. 18, 2016.

*Primary Examiner* — Philip J Bonzell
*Assistant Examiner* — Michael B. Kreiner
(74) *Attorney, Agent, or Firm* — Oblon, McClelland, Maier & Neustadt, L.L.P.

(57) ABSTRACT

A propulsion assembly for aircraft, the assembly including a turbojet having at least one unducted propulsion propeller; and an attachment pylon for attaching the turbojet to a
(Continued)

structural element of the aircraft, the pylon being positioned on the turbojet upstream from the propeller and having an airfoil extending transversely between a leading edge and a trailing edge, the trailing edge of the airfoil of the pylon includes a cutout extending longitudinally over a fraction of the trailing edge facing at least a portion of the propeller, the cutout being configured to increase locally the distance between the trailing edge and the propeller, the cutout presenting an outline having a curved shape presenting at least two points of inflection.

8 Claims, 2 Drawing Sheets

(51) Int. Cl.
*B64D 27/14* (2006.01)
*B64D 29/04* (2006.01)
*B64D 27/26* (2006.01)
*B64D 27/00* (2006.01)

(52) U.S. Cl.
CPC .... *B64C 2230/14* (2013.01); *B64D 2027/005* (2013.01); *B64D 2027/262* (2013.01); *Y02T 50/166* (2013.01); *Y02T 50/44* (2013.01); *Y02T 50/46* (2013.01); *Y02T 50/66* (2013.01)

(56) References Cited

U.S. PATENT DOCUMENTS

| | | | |
|---|---|---|---|
| 2008/0105781 A1* | 5/2008 | Belleville | B64C 11/001 244/51 |
| 2009/0140096 A1* | 6/2009 | Verde Preckler | B64C 1/068 244/55 |
| 2009/0152400 A1* | 6/2009 | Verde Preckler | B64C 1/40 244/133 |
| 2011/0067412 A1* | 3/2011 | Stretton | B64D 29/04 60/782 |
| 2011/0127374 A1* | 6/2011 | Caballero Asensio | B64D 29/04 244/65 |
| 2011/0215172 A1* | 9/2011 | Todorovic | B64D 27/14 239/265.19 |
| 2011/0309189 A1 | 12/2011 | Marche | |
| 2012/0145824 A1 | 6/2012 | Bensilum et al. | |
| 2012/0273609 A1 | 11/2012 | Prat et al. | |
| 2013/0214090 A1* | 8/2013 | Folch Cortes | B64C 1/06 244/55 |
| 2014/0064950 A1* | 3/2014 | Brochard | F01D 25/24 415/208.1 |
| 2016/0152315 A1* | 6/2016 | Martino Gonzalez | B64C 1/06 |

FOREIGN PATENT DOCUMENTS

| | | |
|---|---|---|
| FR | 2 979 391 A1 | 3/2013 |
| FR | 3 008 069 A1 | 1/2015 |
| GB | 2486342 A | 6/2012 |

* cited by examiner

AIRCRAFT PROPULSION UNIT COMPRISING AN UNDUCTED-FAN TURBINE ENGINE AND AN ATTACHMENT PYLON

BACKGROUND OF THE INVENTION

The present invention relates to the general field of turbine engines, and it applies more particularly to turbojets with unducted propulsive propellers.

The present trend concerning civil aircraft engines seeks to reduce in particular their specific consumption and their discharge of atmospheric pollutants. One of the technical solutions adopted by engine manufacturers consists in increasing the bypass ratio between the primary stream (or "hot" stream) and the secondary stream (or "cold" stream) of the aircraft engine. On this topic, several turbojet architectures have been proposed, including turbojets having a pair of contra-rotative open rotors (CRORs), which constitute good candidates for replacing present turbojets, in particular on aircraft used on medium-haul flights.

With a conventional turbojet architecture, the nacelle channels the secondary stream so as to produce the majority of the thrust. With a CROR architecture, the nacelle is removed and the propulsion system comprises an upstream propeller that drives the flow, and a downstream propeller mounted to contrarotate relative to the upstream propeller, having the purpose of straightening out the flow (the downstream propeller could also be stationary in certain other types of architecture). The propulsion efficiency of the engine is improved by recovering the rotary energy more effectively than with a stationary wheel, and the diameter of the propellers is also greatly increased in order to enable a greater quantity of air to be driven.

Nevertheless, in the absence of a nacelle, sound emissions represent a major drawback of that architecture, and more particularly the noise generated by the propellers, and by various interactions between the propellers and the components associated with mounting the engine on the aircraft (also referred to as effects associated with the installation of the engine on the airplane).

When the turbojet is mounted on the fuselage of an aircraft by means of an attachment pylon fastened upstream from the propellers, the assembly is said to be of the "pusher" type. In such a configuration, several sources of noise are associated with the presence of the attachment pylon, and the greatest is constituted by the interaction between the upstream propeller and the wake created downstream from the pylon (and corresponding to a lack of speed of the flow).

This interaction between the wake and the upstream propeller gives rise to two types of noise in particular:
  tonal type noise corresponding to the interaction between the mean wake (constituted by a speed deficit downstream from the pylon) and the upstream propeller, which is present at the natural frequencies of the propeller; and
  broadband type noise corresponding mainly to the interaction between the turbulent structures in the wake and the upstream propeller, with the source being localized at the leading edges of the blades of the upstream propeller and covering a broad band of frequencies.

Various solutions have been proposed to reduce the sound nuisance produced by interactions between the wake from the pylon and the upstream propeller. By way of example, Document FR 2 968 634 proposes compensating for the speed deficit of the wake downstream from the pylon in order to reduce the impact of the wake by means of a pylon that is provided with a trailing edge having two tiltable faces between which air can be blown over the entire span of the pylon. Nevertheless, such a solution presents the drawback of being active and of requiring a large amount of air under pressure to be taken off from the turbine engine, which can in particular reduce its performance.

OBJECT AND SUMMARY OF THE INVENTION

A main object of the present invention is thus to mitigate such drawbacks by proposing a propulsion assembly for aircraft, the assembly comprising:
  a turbojet having at least one unducted propulsion propeller; and
  an attachment pylon for attaching the turbojet to a structural element of the aircraft, said pylon being positioned on the turbojet upstream from the propeller and having an airfoil extending transversely between a leading edge and a trailing edge, the trailing edge of the airfoil of the pylon includes a cutout extending longitudinally over a fraction of the trailing edge facing at least a portion of the propeller, said cutout being configured to increase locally the distance between the trailing edge and the propeller, the cutout presenting an outline having a curved shape presenting at least two points of inflection.

The term "cutout" is used to designate a portion forming a setback in the edge proper of the trailing edge of the pylon. The cutout may extend throughout the entire thickness of the trailing edge. The cutout may be obtained by removing material from an already fabricated pylon, or it may be directly incorporated in the pylon during fabrication.

The propulsion assembly of the invention serves to reduce the size of the wake for a given segment of the trailing edge of the attachment pylon corresponding to the cutout, by reducing the speed deficit created downstream from the pylon (or in other words by reducing the aerodynamic losses in the flow). Specifically, the cutout present in the trailing edge serves to reduce the size of the pylon as "seen" by the flow over the segment in question of the trailing edge. As a result, the speed deficit in the wake downstream from the pylon is reduced level with the cutout. Since the cutout is situated in front of at least a portion of the propeller, the interaction between the wake and the propeller that is responsible for generating undesirable noise is reduced.

In equivalent manner, the cutout makes it possible to increase locally the distance downstream from the attachment pylon over which the wake can dissipate prior to encountering the leading edges of the blades of the upstream propeller, thus making it possible to enhance the decrease in the speed deficit in the plane of the leading edges of the upstream propeller.

Furthermore, the device of the invention makes it possible to reduce the interaction noise between the wake and the upstream propeller in a manner that is entirely passive. Specifically, the noise reduction is obtained without taking air off from the engine, so it does not reduce the performance of the turbojet. Furthermore, the cutout constitutes a setback in the material of the attachment pylon, thereby providing a saving in weight.

Throughout the disclosure, the term "geometrical profile of the trailing edge" designates the curve described by the edge proper of the trailing edge. When the trailing edge does not have a cutout, its geometrical profile may be generally straight or very slightly curved. Likewise, the term "geometrical profile of the cutout" is used to designate the curve described by the outline of the cutout.

Preferably, the trailing edge of the airfoil of the pylon presents a geometrical profile that is curved. In other words, the trailing edge presents a shape that is regular, thereby avoiding vortices being formed downstream from the pylon as a result of irregular edges (such as sharp corners).

Also preferably, the cutout of the trailing edge of the airfoil of the pylon extends longitudinally over the trailing edge between a point of the trailing edge situated at less than 80% of the height of the propeller and a point of the trailing edge situated at more than 110% of the height of the propeller. The presence of the cutout in this portion of the pylon is optimum for reducing the noise generated, in particular at the tip of the blades of the upstream propeller.

In an embodiment of the invention, the cutout in the trailing edge of the airfoil of the pylon presents a geometrical profile made up of a central segment and of two junction curves, said junction curves each presenting a point of inflection and being tangential at their ends to the central segment and to the trailing edge.

In another embodiment of the invention, the cutout in the trailing edge of the airfoil of the pylon presents a geometrical profile comprising a circular arc, or indeed a geometrical profile describing a polynomial curve or describing a spline curve.

The cutout in the trailing edge of the profile of the pylon may present a geometrical profile made up of two junction curves, each junction curve being tangential at one end to the trailing edge and at another end to the other junction curve.

BRIEF DESCRIPTION OF THE DRAWINGS

Other characteristics and advantages of the present invention appear from the following description made with reference to the accompanying drawings which show an embodiment having no limiting character. In the figures.

DETAILED DESCRIPTION OF THE INVENTION

In the present disclosure, the terms "longitudinal", "transverse", and their derivatives are defined relative to the main axis of the pylon extending between the turbojet and the aircraft; the terms "upstream" and "downstream" are defined relative to the flow direction of the fluid passing through the turbojet.

Figure 1:
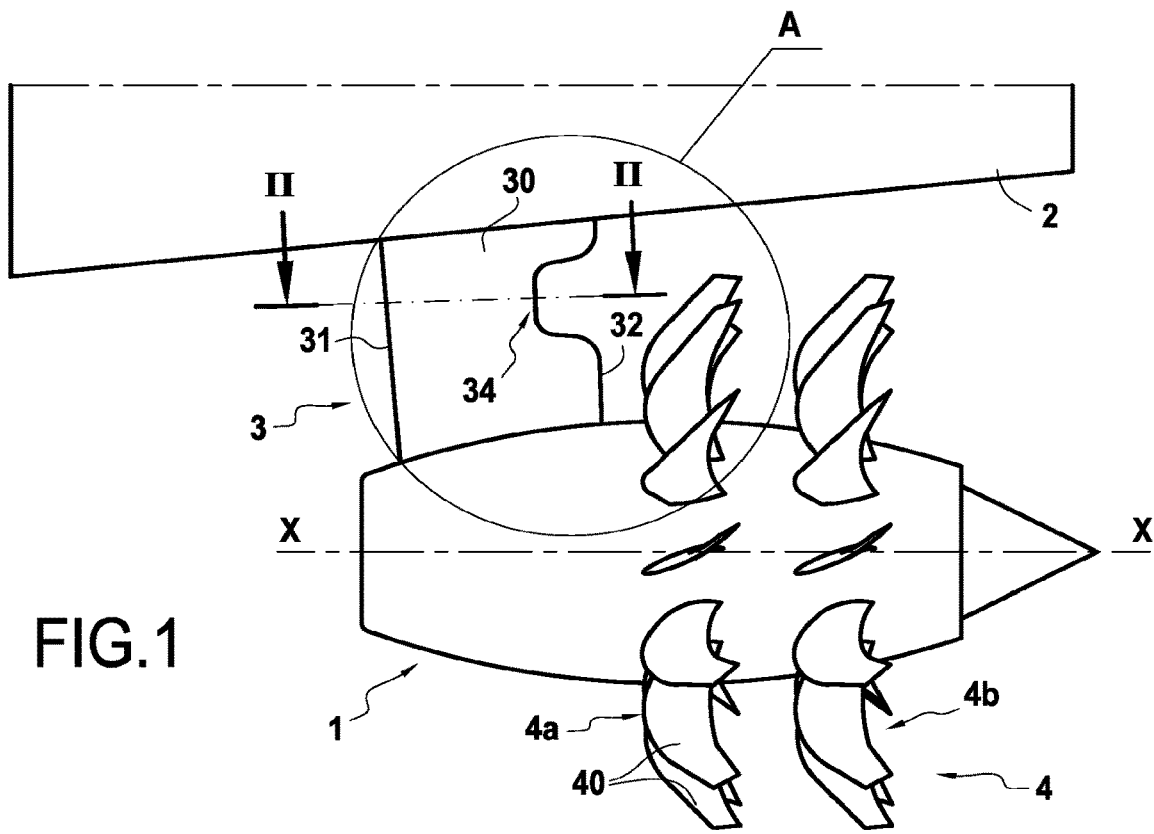
FIG. 1 is a diagrammatic view of a propulsion assembly of the invention.

FIG. 1 is a diagrammatic view of a propulsion assembly comprising a turbojet 1 attached to the fuselage 2 of an aircraft by means of an attachment pylon 3. The turbojet 1 is centered on an axis X-X and has a pair of unducted propellers 4 comprising a rotary upstream propeller 4a (having a set of blades 40) and a downstream propeller 4b that is mounted to contrarotate relative to the upstream propeller 4a. The downstream propeller 4b may equally well be stationary, in which case it is in the form of a stator of variable pitch, as is provided for example with so-called unducted single fan (USF) engines, or in the form of a stator without variable pitch. It should be observed that the turbojet 1 is in a so-called "pusher" configuration, i.e. the attachment pylon 3 is attached to the turbojet 1 upstream from the pair of propellers 4.

The attachment pylon 3 comprises an airfoil 30 extending transversely between a leading edge 31 and a trailing edge 32. In accordance with the invention, the attachment pylon 3 also has a cutout 34 in its trailing edge 32, with at least a portion thereof situated in front of the upstream propeller 4a or facing the upstream propeller 4a. This cutout 34 locally increases the distance between the trailing edge 32 of the pylon 3 and the upstream propeller 4a, which has the effect in particular of reducing the depth of the speed deficit in the wake downstream from the pylon 3 and thus of decreasing the interaction noise that it generates when it meets the upstream propeller 4a.

Figure 2:
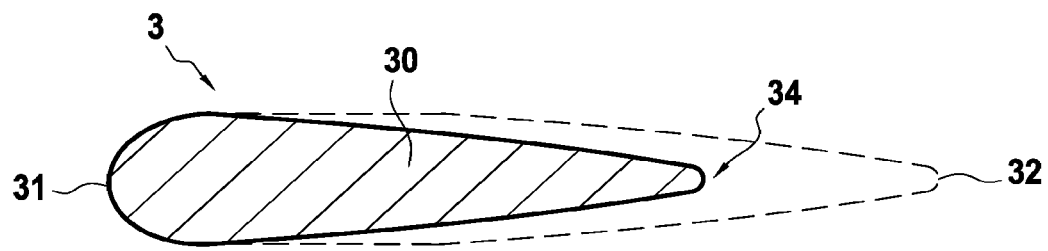
FIG. 2 is a section view of the attachment pylon in plane II of FIG. 1.

FIG. 2 is a section of the FIG. 1 attachment pylon 3 on a plane II, level with the cutout 34. It can be seen in this figure that the cutout 34 may be obtained by removing material compared with the profile of the trailing edge 32 where there is no cutout (shown in dashed lines). It should be observed that the depth of the cutout 34 is also conditioned by the functions that need to be performed by the attachment pylon, specifically attaching the turbojet to the aircraft, and also passing items that serve in particular to feed and control the turbojet from the aircraft (e.g.: electric cables, hydraulic circuits, fuel supplies, etc.), otherwise known as "services", as well as the attachment element.

Figure 1A:
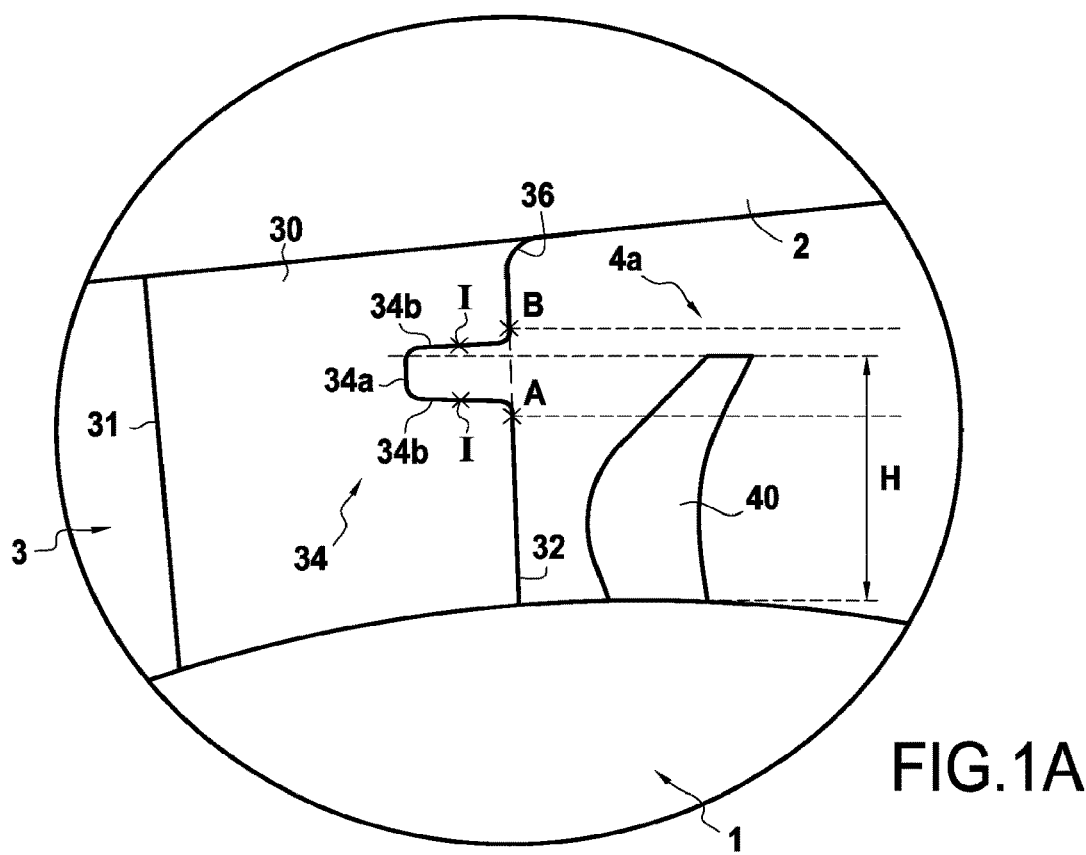
FIG. 1A is a diagrammatic view on a larger scale of a propulsion assembly of the invention showing its attachment pylon.

FIG. 1A is an enlarged view of FIG. 1 in which the attachment pylon 3 is shown in detail in the vicinity of its cutout 34. It can be seen that the cutout 34 extends over a fraction of the trailing edge 32 that is situated at least in part facing the upstream propeller 4a.

The trailing edge 32 with the cutout 34 presents a curved geometrical profile for which all of its derivatives in three dimensions are continuous. In other words, the trailing edge 32 presents a profile that is regular over its entire length, thus avoiding forming vortices due to geometrical irregularities.

In the embodiment shown, the cutout 32 presents a geometrical profile made up of a central segment 34a and of two junction curves 34b. The central segment 34a is substantially parallel to the initial profile of the trailing edge 32, and each of the junction curves 34b presents a point of inflection I, and they are tangential at their ends to the central segment 34a and to the trailing edge 32. In order to improve the overall aerodynamics, the geometrical profile of the trailing edge 32 may also present at its top end a curved portion 36 (shown in FIG. 1A) that is tangential to the fuselage 2 of the aircraft.

Advantageously, the cutout 34 extends longitudinally over the trailing edge 32 between a point A of the trailing edge 32 situated at less than 80% of the height H of the propeller 4a, and a point B of the trailing edge 32 situated at more than 110% of the height H of the propeller 8a. The height H is defined as the radial distance (from the axis X-X of the turbojet) between a point on a blade 40 of the propeller 4a that is flush with the casing of the turbojet 1 and the tip of the blade 40. The sources of the greatest interaction noise between the pylon 3 and the upstream propeller 4a are located in the proximity of the tips of the blades 40 on their leading edges, so this arrangement serves to optimize the reduction of noise over this zone.

Figure 3:
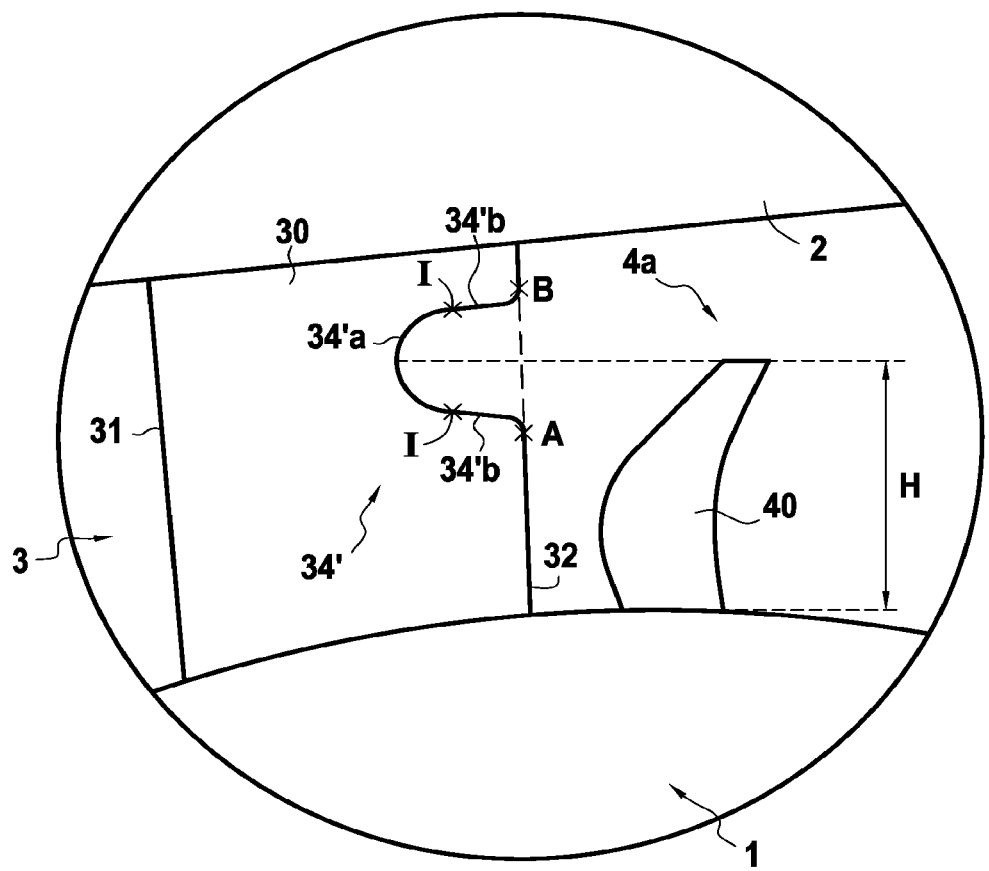
FIG. 3 is an enlarged diagrammatic view of a propulsion assembly in another embodiment of the invention showing its attachment pylon.

Another embodiment of the invention is shown in FIG. 3 (and unless specified to the contrary, the reference signs in the various figures designate characteristics that are identical). In this figure, the attachment pylon 3 presents a trailing edge 32 having a cutout 34' with a geometrical profile that is curved and regular as defined above.

In this example, the cutout 34' presents a geometrical profile having a circular arc 34'a connected to the trailing edge by two junctions that are respectively tangential to the circular arc 34'a and to the trailing edge 32 at their ends. The geometrical profile of the cutout 34' can also be seen as representing two junction curves 34'b that are tangential to each other, and each of them is tangential with the trailing edge 32. In the same manner as above, the cutout 34 extends longitudinally over the trailing edge facing at least a portion of the upstream propeller 4a, and preferably at least between a point situated at 80% of the height H of the propeller 4a and a point situated at 110% of the height of the propeller 4a.

Naturally, the cutouts 34, 34' may present other geometrical profiles, for example describing a polynomial curve or a spline curve, while remaining within the spirit of the present invention. In addition, the device of the invention may have any type of unducted fan turbojet in a "pusher" configuration, e.g. having a pair of contrarotating propellers, or having a single rotary propulsive propeller and a stationary guide propeller downstream.

It should also be observed in the examples shown that the chord relationship of the attachment pylon 3 is substantially constant. The chord relationship corresponds to the way in which the distance between the leading edge 31 of the pylon 3 and its trailing edge 30 where there is no cutout, varies between the fuselage 2 of the aircraft and the turbojet 1. In other words, in the example shown, the leading edge 31 and the trailing edge 32 without cutouts present geometrical profiles that are substantially rectilinear and that are substantially parallel to each other. Nevertheless, the invention may equally well apply to attachment pylons presenting a chord relationship that is different, e.g. that increases, or that decreases, or even that decreases and then increases. Under such circumstances, the geometrical profile of the leading edge 31 or of the trailing edge 32 without the cutout may be slightly curved.

The invention claimed is:

1. A propulsion assembly for aircraft, the assembly comprising:
   a turbojet having at least one unducted propulsion propeller; and
   an attachment pylon for attaching the turbojet to a structural element of the aircraft, said pylon being positioned on the turbojet upstream from the propeller and having an airfoil extending transversely between a leading edge and a trailing edge,
   wherein the trailing edge of the airfoil of the pylon includes a cutout extending longitudinally over a fraction of the trailing edge facing at least a portion of the propeller, said cutout being configured to increase locally a distance between the trailing edge and the propeller, the cutout presenting an outline having a curved shape presenting at least two points of inflection.

2. The propulsion assembly according to claim 1, wherein the trailing edge of the airfoil of the pylon presents a geometrical profile that is curved.

3. The propulsion assembly according to claim 1, wherein the cutout of the trailing edge of the airfoil of the pylon extends longitudinally over the trailing edge between a point of the trailing edge situated at less than 80% of the height of the propeller and a point of the trailing edge situated at more than 110% of the height of the propeller.

4. The propulsion assembly according to claim 1, wherein the cutout in the trailing edge of the airfoil of the pylon presents a geometrical profile made up of a central segment and of two junction curves, said junction curves each presenting one of the points of inflection and being tangential at ends thereof to the central segment and to the trailing edge.

5. The propulsion assembly according to claim 1, wherein the cutout in the trailing edge of the airfoil of the pylon presents a geometrical profile comprising a circular arc.

6. The propulsion assembly according to claim 1, wherein the cutout in the trailing edge of the airfoil of the pylon presents a geometrical profile describing a polynomial curve or a spline curve.

7. The propulsion assembly according to claim 1, wherein the cutout in the trailing edge of the airfoil of the pylon presents a geometrical profile made up of two junction curves, each junction curve being tangential at one end to the trailing edge and at another end to the other junction curve.

8. The propulsion assembly according to claim 1, wherein a top end of the trailing edge presents a curved portion that is tangential to the structural element of the aircraft.

* * * * *